(12) United States Patent
Kim

(10) Patent No.: US 8,286,290 B2
(45) Date of Patent: Oct. 16, 2012

(54) DOCK LEVELER

(76) Inventor: Byung Woong Kim, Seoul (KR)

( * ) Notice: Subject to any disclaimer, the term of this patent is extended or adjusted under 35 U.S.C. 154(b) by 0 days.

(21) Appl. No.: 13/132,903

(22) PCT Filed: Jan. 5, 2009

(86) PCT No.: PCT/KR2009/000033
§ 371 (c)(1),
(2), (4) Date: Jun. 3, 2011

(87) PCT Pub. No.: WO2010/064760
PCT Pub. Date: Jun. 10, 2010

(65) Prior Publication Data
US 2011/0239381 A1    Oct. 6, 2011

(30) Foreign Application Priority Data
Dec. 3, 2008 (KR) .................. 10-2008-0122014

(51) Int. Cl.
*E01D 1/00* (2006.01)
(52) U.S. Cl. .................. 14/69.5; 14/71.1; 14/71.3
(58) Field of Classification Search ........... 14/69.5–71.5
See application file for complete search history.

(56) References Cited

U.S. PATENT DOCUMENTS

| | | | | |
|---|---|---|---|---|
| 5,160,236 A | * | 11/1992 | Redding et al. | 414/537 |
| 5,457,838 A | * | 10/1995 | Gelder et al. | 14/69.5 |
| 5,636,399 A | * | 6/1997 | Tremblay et al. | 14/71.1 |
| 6,081,954 A | * | 7/2000 | Palmersheim et al. | 14/69.5 |
| 7,802,337 B2 | * | 9/2010 | van Roosmalen et al. | 14/69.5 |
| 2007/0101517 A1 | * | 5/2007 | Digmann et al. | 14/71.1 |
| 2007/0261181 A1 | * | 11/2007 | Willard et al. | 14/71.1 |
| 2007/0294845 A1 | | 12/2007 | Muhl et al. | |

FOREIGN PATENT DOCUMENTS

| | | |
|---|---|---|
| JP | 59-140236 | 9/1984 |
| JP | 3-30737 | 3/1991 |
| JP | 2003-128265 | 5/2003 |
| KR | 20-0385107 | 5/2005 |

OTHER PUBLICATIONS

International Search Report for PCT/KR2009/000033 mailed Sep. 2, 2009.
Written Opinion of the International Searching Authority for PCT/KR2009/000033.

* cited by examiner

*Primary Examiner* — Raymond W Addie
(74) *Attorney, Agent, or Firm* — Christopher Paul Mitchell

(57) ABSTRACT

The present invention provides a dock leveler that: facilitates safe and smooth movement of any driving device by reducing inclination of the dock leveler; and allows easy maintenance by removing a driving unit such as a hydraulic device. The dock leveler comprises a body which is fixed and rotatable on the rear top of an installation space for a dock; and a support unit supporting the body when positioned inside the installation space and sliding toward the front of the body so that the rear of the support unit can be connected to the front of the body when operating as a passage way for a transportation unit or a carrying unit.

5 Claims, 2 Drawing Sheets

[Fig. 1]
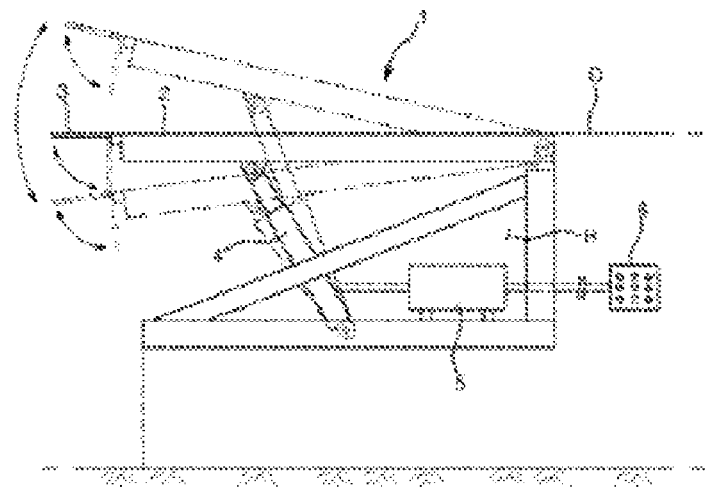
[Fig. 2]
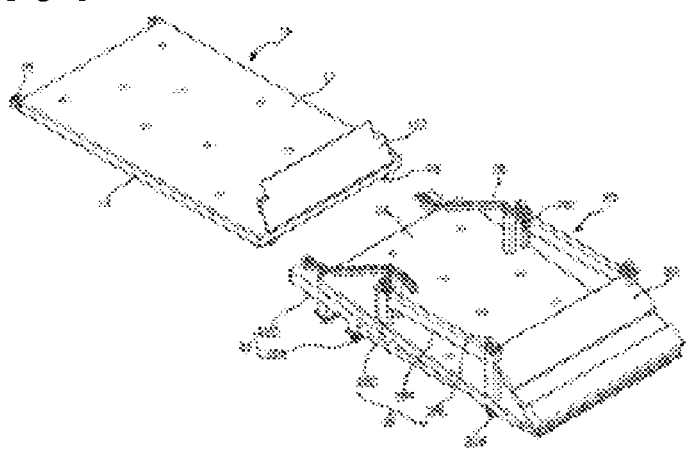
[Fig. 3]
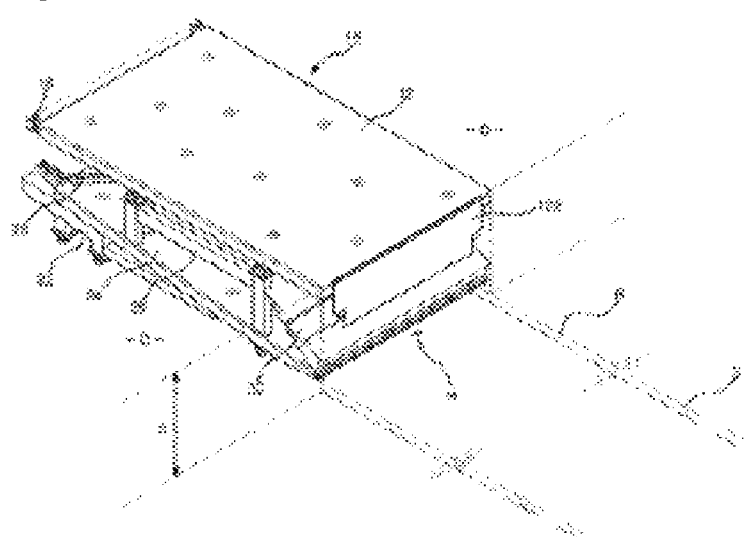

[Fig. 4]
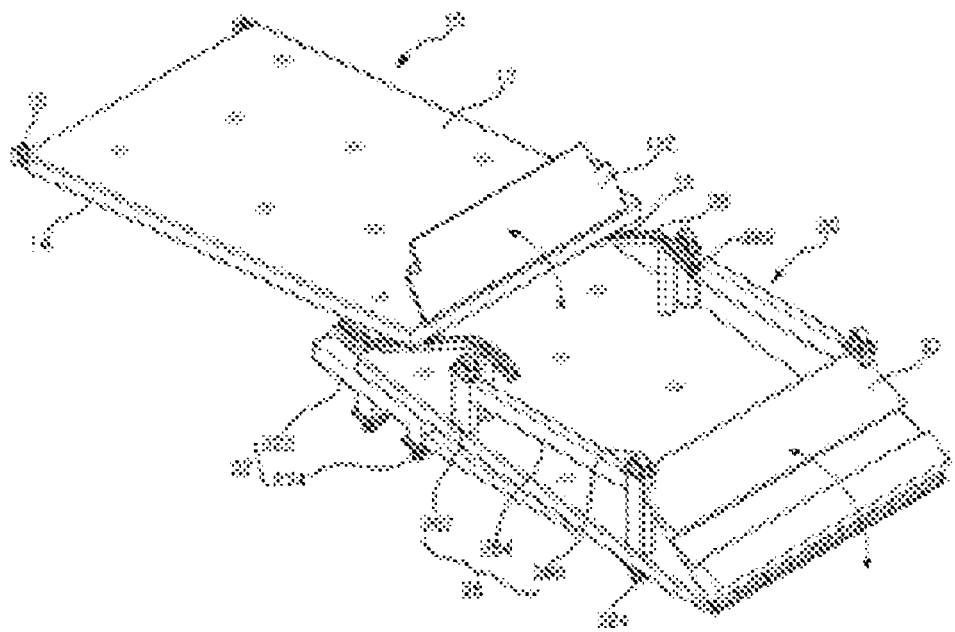
[Fig. 5]
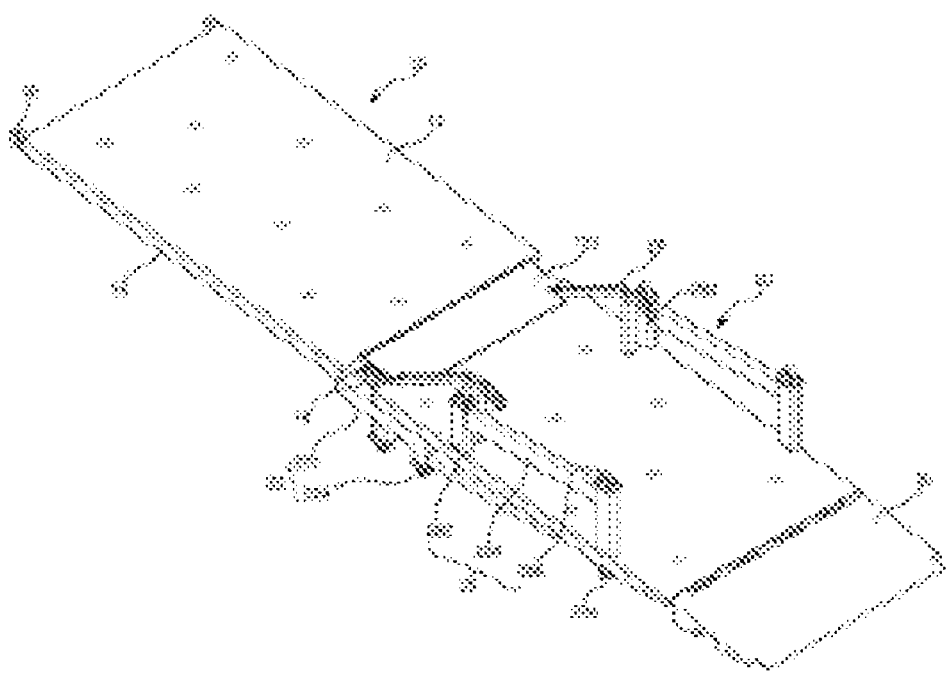

DOCK LEVELER

RELATED APPLICATIONS

This application is a 371 application of International Application No. PCT/KR2009/000033, filed Jan. 5, 2009, which in turn claims priority from Korean Patent Application No. 10-2008-0122014, filed Dec. 3, 2008, each of which is incorporated herein by reference in its entirety.

TECHNICAL FIELD

The present invention relates to a dock leveler, more specifically, a dock leveler that ensures safe and smooth passage of any driving device by reducing a degree of inclination and allows easy maintenance by omitting a driving means such as a hydraulic device.

BACKGROUND ART

In general, various transportation means, carrying means and the like are used when cargo is loaded in or carried out from distribution warehouse, factory and the like and various auxiliary means such as the dock leveler is used for conforming a height of a deck of the distribution warehouse or factory to a height of a loading box of the transportation means such as cargo vehicle in order to stably carry and load the cargo from such a transportation means or carrying means.

As illustrated in FIG. 1, a prior dock leveler (1) is installed in an upper portion of an installation space (H) formed in a dock (D) of a warehouse or factory in such way that the height of the leveler can be adjusted. This dock leveler (1) is positioned at the same level as that of a plane of the dock (D) in a normal state, and has a plate (2) that can be raised or lowered depending to the height of a loading box of a transportation means at the time of carrying and loading of cargo or goods. A connecting plate (3) for connecting with the loading box of the transportation means is provided in such a way as to be developed at a front end portion of the plate (2). Furthermore, installed below the plate (2) is one or a plurality of lifting device (4) for practically lifting the plate (2) in a rotation manner. The lifting device (4) is generally formed of hydraulic cylinder or pneumatic cylinder etc., and an actuator (5) for supplying hydraulic pressure or pneumatic pressure is naturally connected to each lifting device (4), and a controller (6) for controlling each lifting device (4) and finally the lifting of the plate (2) is connected to the actuator (5).

According to the construction as described above, when the cargo is loaded on the transportation means or unloaded therefrom, if the controller (6) operates the actuator (5) depending on the height of the loading box of the transportation means, the hydraulic pressure or pneumatic pressure is supplied from the actuator (5) to the lifting device (4) or discharged from the lifting device (4) and accordingly the lifting device (4) is operated, whereby the plate (2) is raised or lowered, with a result of its height being adjusted. If the height of the plate (2) is adjusted as described above, the connecting plate (3) provided at the front end portion of the plate (2) is developed to be connected to the loading box of the transportation means, whereby the cargo can be stably carried out and loaded.

However, the prior dock leveler as described above is only used to carry out and load the cargo by simply conforming the level of the deck of the warehouse or factory to that of the loading box of the transportation means with use of the plate, and even though the height of the plate is decreased to the lowest level, a level difference with the ground occurs, and moreover even in the case when the plate is constructed to contact with the ground, it exhibits a steep inclination, and hence the transportation apparatus or carrying apparatus cannot pass through the plate, as a result there is a problem of applicability being limited.

Furthermore, there is another problem that, since installation of the actuators and lifting device is essential for raising and lowering the plate, installation and maintenance costs are excessively spent.

DISCLOSURE OF THE INVENTION

Problems to be Solved by the Invention

The present invention has been devised to solve the problems of the prior art as described above, and its object is to provide a dock leveler where the plate exhibits a gentle inclination and passage of the transportation apparatus or carrying means is allowed.

Another object of the present invention is to provide a dock leveler where a separate actuating means for raising and lowering the plate is not required and therefore installation and maintenance of the dock leveler are easy.

Means for Solving the Problem

The above-mentioned objects can be achieved by a dock leveler which is installed in an installation space formed in a dock of a warehouse or factory and can provide a passage way for transportation means or carrying means and in which rails are formed forward from within the installation space on the ground, characterized in that the dock leveler comprises a body which is rotatably coupled to upper portion of a rear end of the installation space of the dock; and a supporting device which supports the body when positioned in the installation space and moves toward the front of the body so that a rear end portion of the supporting device can be connected to a front end portion of the body when the passage way for the transportation means or carrying means is to be provided.

Advantageous Effects

By the dock leveler according to the present invention, an effect is obtained that reliability and safety is improved by providing the supporting device that supports the body and forms the gently inclined passage way by connection to the body.

Furthermore, another effect is obtained that installation and maintenance are easy and do not cost a lot and convenience and economy are improved because the supporting device can be utilized with no need to install a separate actuating means for raising and lowering the body.

BRIEF DESCRIPTION OF THE DRAWINGS

FIG. 1 is a side view showing a prior dock leveler.

FIG. 2 is an exploded perspective view of a dock leveler according to the present invention.

FIG. 3 is a perspective view showing a state that a supporting device supports a body in the dock leveler of FIG. 2.

FIG. 4 is a perspective view showing a state that the supporting device is moving in the dock leveler of FIG. 3.

FIG. 5 is a perspective view showing a state that the supporting device is connected to a front end portion of the body, thereby providing a passage way in the dock leveler of FIG. 4.

BEST MODES FOR CARRYING OUT THE INVENTION

Herein below, a preferred example according to the present invention will be described in detail with reference to the attached drawings.

FIG. 2 is an exploded perspective view of a dock leveler according to the present invention, FIG. 3 is a perspective view showing a state that a supporting device supports a body in the dock leveler of FIG. 2, FIG. 4 is a perspective view showing a state that the supporting device is moving in the dock leveler of FIG. 3, and FIG. 5 is a perspective view showing a state that the supporting device is connected to a front end portion of the body, thereby providing a passage way in the dock leveler of FIG. 4.

Firstly referring to FIGS. 2-5, the dock leveler according to the present invention is installed in a warehouse or factory for keeping or taking out or carrying and loading the cargo or goods, and for installation of the dock leveler, a dock (D) must be basically arranged corresponding to a floor height (h) of a building in the warehouse or factory for carrying and loading of the cargo, and formed in the dock (D) must be an installation space (H) for ensuring a sufficient space where the dock leveler can be installed. Furthermore, rails (R) for guiding movement of a supporting device described below and also limiting forward movement of the supporting device are preferably installed on the ground where the dock leveler according to the present invention is installed. Furthermore, it is preferable to install stoppers (S) described below for limiting the movement of the supporting device on the rails (R)

Installed at an upper portion of the installation space (H) is a body (10) which is rotatable so that its surface can be positioned at the same level as that of the surface of the dock (D). The body (10) is in a rectangular shape and has a rectangular plate (12) which is formed in a net or convex-concave type so as to prevent slipping of the transportation means or carrying means; a supporting frame (14) installed integral with a lower surface of the plate (12) to support the plate and reinforcing the strength of the plate (12); pivot members (16) provided at rear end portion of the plate (12) so as to couple the plate (12) to the dock (D) in such a way that the plate can be rotated relative to the dock; and sliding members (18) provided at both sides of a front end portion of each supporting frame (14) and sliding on guides of the supporting device described below while contacting with the guides.

Of course, provided at a front end portion of the plate (12) is a connecting plate (122) which can be developed so that it can be connected to a rear end portion of the supporting device described below. Of course, it is preferable that the connecting plate (122) is installed at the front end portion of the plate (12) so that it can be rotated on a rotation pin or in a hinged manner for easy rotation.

Furthermore, each sliding member (18) may be provided in various forms that allow it to smoothly contact with and slide on the guides of the supporting device described below, and may be form from, for example, rollers, projections, wheels and the like.

The supporting device (20) for supporting the body (10) is movably provided below the body (10) or in the installation space (H) of the dock (D). The supporting device (20) is preferably constructed in such a way that it serves to support the frame (14) attached below the body (10) and serves as a plate deck by connection to the front end portion of the body (10).

The supporting device (20) has a base (22) that is formed in such a way as to move on the ground and supports the whole supporting device. The base (22) has a plurality of frames (222) with a sufficient strength, and a plurality of rollers (224) that are installed at proper position on each frame (222) to allow smooth movement of the supporting device (20), and of course each roller (224) rollably engages with the rails (R) installed on the ground.

Integrally provided on an upper portion of the base (22) is a supporting plate (24) inclined forward. The supporting plate (24) is preferably form from a rectangular plate of net type or convex-concave type so as to prevent slipping of the carrying means or transportation means. In particular, the supporting plate (24) is formed in such a way as to be inclined forward and downward at the same inclination angle as that of the plate (12) of the body (10) rotated forward and downward to be maintained as such.

Furthermore, supporting members (26) for practically supporting the plate (12) of the body (10) is provided on both side portions of the base (22).

The supporting members (26) integrally have a plurality of vertical frames (262) with a sufficient strength, longitudinal frames (264) for connecting the vertical frames (262) each other, and rolling members (266) which are arranged at upper end portion of each vertical frame (262) and can reciprocate even in the state that the supporting device (20) supports the plate (12) of the body (10). Each rolling member (266) is preferably formed from a roller which rollably engages with lower surface of the supporting frame (14) of the body (10).

Meanwhile, installed on both side portions, more specifically, both side portions located inward from the supporting members (26) are guides (28) with which the sliding members (18) provided at both sides of the front end portion of the supporting frames (14) of the body (10) slidingly contact so that the body (10) can be smoothly rotated forward and downward.

The guides (28) are inclined downward from forward to backward, and preferably have grooves (282) which are formed over the whole length of the guides so that the sliding members (18) can stably slide. Furthermore, front portions of the guides (28) are preferably formed in such a way as to be gently curved so that the sliding members (18) of the body (10) can be stably and smoothly seated in the grooves (282), and it is preferable that rear portions of the guides (28) are horizontally and closedly formed so that the sliding members (18) of the body (10) can be stably and restrainedly maintained to be prevented from being deviated from the guides.

Of course, foldably or developedly installed at a front end portion of the supporting plate (24) is an auxiliary supporting plate (30) having the same inclination angle as that of the supporting plate (24) to eliminate a difference of height between the front end portion of the supporting plate (24) and the ground. The auxiliary supporting plate (30) is preferably connected to the front end portion of the supporting plate (24) in a hinged manner for smooth folding or developing of the auxiliary supporting plate.

Herein below, operation mode and method of using of the dock leveler constructed as described above will be explained in detail.

Firstly, in a normal state, that is to say, a state that a level of a surface of the plate (12) of the body (10) must be maintained so as to coincide with a level of a surface of the dock (D), the supporting device (20) is maintained in the state of being positioned within the installation space (H), that is to say, below the body (10) to support the supporting frame (14) of the body (10).

Here, each rolling member (266) provided on the upper end portion of each vertical frame (262) of the supporting members (26) of the supporting device (20) supports the body (10) while contacting with the lower surface of the supporting frame (14) provided on the lower portion of the plate (12) of the body (10). In such a state, of course, the connecting plate (122) is used to connect the height of the loading box of the transportation means such as cargo vehicle and the plate (12), and thus cargo can be carried to the loading box of the transportation means and loaded thereon using a carrying means such as forklift trucks.

In particular, in the case that a passage way must be provided for allowing the transportation means or carrying means to pass into and out of the warehouse or factory connected to the dock (D), the supporting device (20) is moved outward to be connected to the body (10), whereby the passage way for the transportation means or carrying means is ensured.

That is to say, the passage way is ensured by connecting the front end portion of the plate (12) of the body (10) and the rear end portion of the supporting device (20) after pulling the supporting device (20) positioned below the body (10) and moving it toward the front of the body (10) by means of the carrying means such as the forklift trucks.

More specifically, if the supporting device (20) is pulled forward, each roller (224) installed at the lower portion of the frame (222) of the base (22) of the supporting device (20) and contacting with the ground moves along the rails (R) on the ground, and at the same time the rolling member (266) provided on the upper end portion of each vertical frame (262) of the supporting members (26) rolls while contacting with the supporting frame (14) on both sides of the body (10), whereby the supporting device (20) can smoothly move toward the front of the body (10).

If the supporting device (20) continues to move forward and accordingly the rolling members (266) installed on the rear vertical frames (262) or the upper end portion thereof move past the front end portion of the plate (12) of the body (10), each sliding member (18) provided at the front end portion of the supporting frame (14) of the body (10) contacts with the front portion of each guide (28) of the supporting device (20), and thereafter slidingly moves along the grooves (282) of the guides (28) and, in the meantime, the body (10) is rotated by means of the pivot members (16), whereby the plate (12) is inclined downward.

If the supporting device (20) further moves forward and accordingly each roller (224) of the supporting device (20) moves along the rails (R) on the ground to abut against the stopper (S) and at the same time the sliding members (18) of the body (10) reach the rear end portions of the guides (28) of the supporting device (20) to stop moving, movement of the supporting device (20) is stopped. At this time, the rear end portion of the supporting device (20) is temporarily connected to the front end portion of the body (10).

In the state of connecting the body (10) and the supporting device (20) as described above, the connecting plate (122) provided at the front end portion of the plate (12) of the body (10) is developed to be rested on the rear portion of the plate (24) of the supporting device (20), and then the auxiliary supporting plate (30) provided at the front end portion of the supporting plate (24) of the supporting device (20) is developed to be rested on the ground, whereby a complete passage way for movement is ensured.

In the state that the passage way is formed by connecting the body (10) and the supporting device (20) as described above, the plate (12) of the body (10), and the supporting plate (24) and auxiliary supporting plate (30) of the supporting device (20) has the same inclination angle.

Therefore, a gently inclined continuous passage way can be ensured by connection of the plate (12) and connecting plate (122) of the body (10) and the supporting plate (24) and auxiliary supporting plate (30) of the supporting device (20).

Meanwhile, when the body (10) is to be maintained at the same level as that of the dock (D), the supporting device (20) is returned following a reverse procedure of that described above.

That is to say, if an operator pushes the supporting device (20) backward by means of the carrying means such as the forklift trucks with the connecting plate (122) of the body (10) and the auxiliary plate (30) of the supporting device (20) folded, the supporting device (20) starts to move backward by means of each roller (224) provided at the base (22). At this time, the sliding members (18) provided at the front end portion of each supporting frame (14) of the body (10) depart from the rear end portion of the guides (28) of the supporting device (20) and then slidingly move relative to the guides (28) along the grooves (282) thereof.

If the supporting device (20) is further pushed, the plate (12) of the body (10) is lifted upward while the sliding members (18) of the body (10) are relatively moving along the guides (28) of the supporting device (20), and when the sliding members (18) move up to the uppermost portion of the guides (28), the plate (12) of the body (10) is brought into the horizontal state.

After that, if the supporting device (20) is further pushed backward, each rolling member (266) provided at the upper end portion of each vertical frame (262) of the supporting member (26) rollingly move while contacting with the supporting frame (14) of the body (10), and thus the supporting device can be smoothly moved. Of course, also at this time the rollers (224) provided at the lower portion of the supporting device (20) rollingly move along the rails (R).

Finally, if the supporting device (20) is further moved backward to completely return to below the plate (12) of the body (10), the supporting device (20) is stopped.

Of course, in the state that the supporting device (20) is completely returned to below the body (10), since each rolling member (266) provided at the upper end portion of each vertical frame (262) of the supporting members (26) of the supporting device (20) supports the body (10) while contacting with the lower surface of the supporting frame (14) provided at both sides of the lower portion of the plate (12) of the body (10), the body (10) can be firmly, stably and fixedly maintained, and cargo can be stably carried and loaded using the transportation means such as cargo vehicle or the carrying means such as the forklift trucks.

Industrial Applicability

Therefore, since the supporting device can be utilized as a supporting means for supporting the body and also as a plate deck means obtained by connection to the body, cargo can be stably carried and loaded and a stable passage way for the transportation means or carrying means can be provided.

The preferred examples of the present invention has been described as above, however, it should be understood that persons having ordinary skills in the art may implement various modified examples and altered examples without departing from the attached claims.

The invention claimed is:

1. A dock leveler which is installed in an installation space formed in a dock of a warehouse or factory and can provide a passage way for transportation means or carrying means and in which rails are formed forward from within the installation space on the ground, wherein the dock leveler comprises:
a body which is rotatably coupled to upper portion of a rear end of the installation space of the dock; and
a supporting device which supports the body when positioned in the installation space and moves toward the front of the body so that a rear end portion of the supporting device can be connected to a front end portion of the body when the passage way for the transportation means or carrying means is to be provided, wherein the supporting device comprises:

a base formed in such a way as to move on the ground and supporting the whole supporting device;

a supporting plate inclined forward on upper portion of the base at the same inclination angle as that of the plate of the body when connected to a front end portion of the body;

supporting members installed on both side portions of the base to support the plate of the body; and guides installed on both side portions of the base inward from the supporting members and supporting the sliding members of the body in such a way that the sliding members can move relative to the guides so that the front portion of the body can be rotated downward.

2. The dock leveler according to claim 1, wherein the body comprises:

a rectangular plate formed in such a way as to prevent slipping of the transportation means or carrying means;

a supporting frame installed integral with a lower surface of the plate to support the plate;

pivot members provided at rear end portion of the plate to couple the plate to the dock in such a way that the plate can be rotated relative to the dock; and sliding members provided at both sides of a front end portion of the supporting frame and relatively moving according to movement of the supporting device.

3. The dock leveler according to claim 1, wherein the base has a plurality of frames for maintaining a strength, and a plurality of rollers rotatably engaging with the rails for movement of the supporting device.

4. The dock leveler according to claim 1, wherein the supporting members comprise:

a plurality of vertical frames fixed at its lower end portions to side portions of the supporting plate;

longitudinal frames for connecting the vertical frames each other; and rolling members rotatably installed on upper end portion of each vertical frame so that the supporting device can move while supporting the plate of the body.

5. The dock leveler according to claim 1, wherein the dock leveler further comprises an auxiliary supporting plate foldably installed at the front end portion of the supporting plate.

* * * * *